UNITED STATES PATENT OFFICE 2,265,215

MANUFACTURE OF AMINO-TRIAZINES

Gustave Widmer, Basel, Switzerland, assignor, by mesne assignments, to Ciba Products Corporation, Dover, Del., a corporation of Delaware No Drawing. Application July 5, 1938, Serial No. 217,627. In Switzerland July 24, 1937

3 Claims. (Cl. 260—248)

The present invention relates to the manufacture of 2.4.6-triamino-1.3.5-triazine (melamine) from dicyandiamide in the presence of ammonia.

It is known that melamine (2.4.6-triamino-1.3.5-triazine) may be obtained by heating to 100° C. for several hours a solution of dicyandiamide in liquid ammonia (Franklin, J. Am. Chem. Soc. 44, 504 (1922)). It has been found that the quantity of melamine obtained is dependent within certain limits on the one hand on the concentration of the dicyandiamide in liquid ammonia and on the other hand on the time of the reaction, but in all cases is comparatively small within the working conditions disclosed in the above publication. As has been ascertained, liquid ammonia is capable to dissolve at room temperature about its equal weight of dicyandiamide. If now, for example, a solution of 1 part of dicyandiamide in 1 part of ammonia, viz. a solution saturated at room temperature, is treated at 100° C. for 2 hours, there is obtained about 15 per cent of melamine. By treating a like mixture for 6 hours the yield rises to some 30 per cent of melamine. If, however, there are used 3 parts of ammonia for 1 part of dicyandiamide the yield in a 2 hours reaction sinks to a few per cent of melamine and that of a 6 hours reaction is about 17 per cent of melamine.

This invention is based on the observation that a substantially enhanced yield of melamine is obtained with similar times of reaction and temperatures if the proportion of ammonia is so far diminished that the dicyandiamide used is not fully dissolved at room temperature, viz. below the proportion by weight 1:1. The improvement becomes manifest already with a proportionately small lowering of the amount of ammonia. Thus for instance by using 60 per cent of ammonia as calculated on the weight of dicyandiamide, the yield after 6 hours' heating to 100° C. rises to over 42 per cent of melamine and by diminishing the amount of ammonia to 33 per cent the yield of melamine under otherwise equal conditions is as high as 55 per cent. By diminishing the amount of ammonia to less than 20 per cent the yield of melamine diminishes again to below 40 per cent. The preferred ranges of ammonia thus lie between about 20 and 60 per cent calculated on the weight of dicyandiamide.

A further considerable increase of yield may be attained in each case if the time of reaction is prolonged.

The yields cited are calculated on the dicyandiamide used.

The following example illustrates the invention:—

Into a rotary autoclave containing 450 parts by weight of dicyandiamide 150 parts of liquid ammonia are pumped whereby the greater part of the dicyandiamide remains undissolved. The mixture is then heated for 6 hours at 100° C., the pressure rising to about 30 atmospheres. After the ammonia has been distilled the product is found to contain about 55 per cent of melamine. If the duration of the reaction is prolonged to 18 hours, the product contains about 70 per cent of melamine, while with a still longer reaction the yield may be still further raised.

What I claim is:—

1. A process for the manufacture of melamine from dicyandiamide and liquid ammonia at a temperature up to 100° C. in which the proportion of ammonia used is less than that necessary to dissolve completely the dicyandiamide at room temperature but not substantially less than 20 per cent of the weight of dicyandiamide.

2. A process for the manufacture of melamine from dicyandiamide and liquid ammonia at a temperature up to 100° C. in which the weight of ammonia used ranges between 20 and 60 per cent of the weight of dicyandiamide.

3. A process for the manufacture of melamine from dicyandiamide and liquid ammonia at a temperature up to 100° C. in which the weight of ammonia used is approximately one third of the weight of dicyandiamide.

GUSTAVE WIDMER.